United States Patent [19]

Silverstein et al.

[11] Patent Number: 4,819,794

[45] Date of Patent: Apr. 11, 1989

[54] FILM SPOOL STORAGE CASE

[75] Inventors: Steven Silverstein, Paris, France; Christopher Scholz, New York, N.Y.

[73] Assignee: Light and Shadow, Inc., Los Angeles, Calif.

[21] Appl. No.: 156,211

[22] Filed: Feb. 16, 1988

[51] Int. Cl.$^4$ .................................. B65D 85/671
[52] U.S. Cl. ..................... 206/225; 206/371; 206/391; 206/459; 206/508; 220/23; 220/94 R; 220/335
[58] Field of Search ............... 206/214, 224, 316, 371, 206/389, 391, 392, 393, 394, 398, 508, 509, 558–560, 225, 459; 220/23, 212, 94 A, 94 R, 326, 334, 335, 338, 340, 344; 354/275

[56] References Cited

U.S. PATENT DOCUMENTS

| 49,617 | 8/1865 | Fletcher | 206/371 |
|---|---|---|---|
| 1,827,929 | 10/1931 | Bigelow | 220/334 |
| 2,206,848 | 7/1940 | McAvoy | 220/344 |
| 2,786,596 | 3/1957 | Claud-Mantle | 220/326 |
| 2,850,200 | 9/1958 | Hofman | 220/334 |
| 2,960,254 | 11/1960 | Kiba | 220/338 |
| 3,194,462 | 7/1965 | Tupper | 220/94 R |
| 3,360,116 | 12/1967 | Somers et al. | 220/334 |
| 3,451,322 | 6/1969 | Noda et al. | 354/275 |
| 3,586,200 | 6/1971 | Kramer et al. | 220/94 R |
| 3,927,797 | 12/1975 | Flider | 220/94 A |
| 4,235,338 | 11/1980 | Dugan et al. | 206/508 |
| 4,319,762 | 3/1982 | Streit et al. | 220/335 |
| 4,591,056 | 5/1986 | Groch | 206/214 |

FOREIGN PATENT DOCUMENTS

| 0789887 | 7/1968 | Canada | 206/508 |
|---|---|---|---|
| 0861065 | 11/1952 | Fed. Rep. of Germany | 220/326 |
| 2403442 | 7/1975 | Fed. Rep. of Germany | 206/214 |
| 0002129 | of 1915 | United Kingdom | 206/391 |
| 1282024 | 7/1972 | United Kingdom | 206/391 |

*Primary Examiner*—Jimmy G. Foster
*Attorney, Agent, or Firm*—Burgess, Ryan and Wayne

[57] ABSTRACT

A film spool storage case includes a main housing having a base and a side wall, the base and the side wall defining a cavity for receiving a plurality of film spools therein, the side wall having a height at least as great as the heights of the spools and the side wall defining an opening at an upper end thereof; a cover releasably securable to the housing in covering relation to the opening; and a plurality of positioning projections secured to the base for positioning the film spools in the cavity in spaced relation.

17 Claims, 13 Drawing Sheets

FILM SPOOL STORAGE CASE

BACKGROUND OF THE INVENTION

This invention relates generally to film spools and, more particularly, is directed to the storage and organization of a plurality of film spools for photographers.

Photographic film used by photographers is typically wound on a spool made of a plastic material. Conventionally, at least one end of the film spool is each formed with a cavity. Such spools have different shapes and sizes, the most common sizes being 135 or 120 films in which the spools respectively have diameters of 24 mm and 6 cm and lengths of 36 mm and 6 cm.

Generally, a professional photographer uses approximately 40 rolls of film daily. After each roll has been used, the photograher generally places the roll of film in a plastic bag or an envelope prior to sending the rolls of film to a specialized laboratory for developing. Considering the risk of damage to the rolls of film and the potential loss therefrom, which can have serious consequences, such manner of transporting the rolls of film prior to developing is inefficient, inconvenient and dangerous.

In addition, the photographer often needs to provide special instructions for some of the rolls of film for developing. When the rolls of film are merely placed in the plastic bags or envelopes, it is difficult to provide such instructions. In other words, it would be advantageous to provide some organization of the films in order that information regarding each roll can be transmitted to the development laboratory.

OBJECTS AND SUMMARY OF THE INVENTION

Accordingly, it is an object of the present invention to provide a film spool storage case that overcomes the aforementioned problems with the prior art.

More particularly, it is an object of the present invention to provide a film spool storage case that stores and organizes the exposed film spools.

It is another object of the present invention to provide a film spool storage case in which the organized film spools therein can be easily and readily identified and marked with information to be transmitted to the development laboratory.

It is still another object of the present invention to provide a film spool storage case in wihch up to 40 film spools can be stored and organized, corresponding to the number of film spools typically used by a photographer each day.

It is yet another object of the present invention to provide a film spool storage case which, when closed, is moisture proof to prevent damage of the film spools stored therein.

It is yet another object of the present invention to provide a film spool storage case in which the film spools are tightly and removably retained in the case.

It is a further object of the present invention to provide a film spool storage case having means for storing a writing instrument therein.

It is a still further object of the present invention to provide a film spool storage case that can be easily and readily stacked with other film spool storage cases.

It is a yet further object of the present invention to provide a film spool storage case in which a removable handle and/or strap can be secured for carrying the case.

It is another object of the present invention to provide a film spool storage case of the aforementioned type that is easy and inexpensive to manufacture and use.

In accordance with an aspect of the present invention, a film spool storage case includes a main housing having a base and a side wall, the base and the side wall defining a cavity for receiving a plurality of film spools therein, the side wall having a height at least as great as the height of the spools and the side walls defining an opening at an upper end thereof; a cover releasably securable to the housing in covering relation to the opening; and a plurality of projecting positioning means secured to the base for positioning the film spools in the cavity in spaced relation.

The above and other objects, features and advantages of the present invention will become readily apparent from the following detailed description thereof which is to be read in connection with the accompanying drawings.

DETAILED DESCRIPTION OF THE PREFERRED EMBODIMENTS

Referring to the drawings in detail, and initially to FIGS. 1-7 thereof, a film spool storage case 10 according to a first embodiment of the present invention generally includes a circular main housing 12 having a circular base 14 and an annular side wall 16 secured at the periphery of base 14. In this manner, base 14 and side wall 16 define a cavity 18 for receiving a plurality of film spools 20 therein. The upper end of side wall 16 defines an opening 22, and the height of side wall 16 is at least as great as the height of film spools 20, and preferably is greater than the height of film spools 20.

Annular reinforcing and protecting pads 24 and 26, preferably made of rubber or a similar material, are secured to the external upper and lower edges of side wall 16, respectively, to protect housing 12 during normal use. Such annular pads 24 and 26 can be constituted by rubber rings which are adhered by gluing or the like to side wall 16. In addition, a rubber sealing ring 28 is secured at the upper edge of side wall 16, the purpose of which will be apparent from the description which follows.

Figure 3:
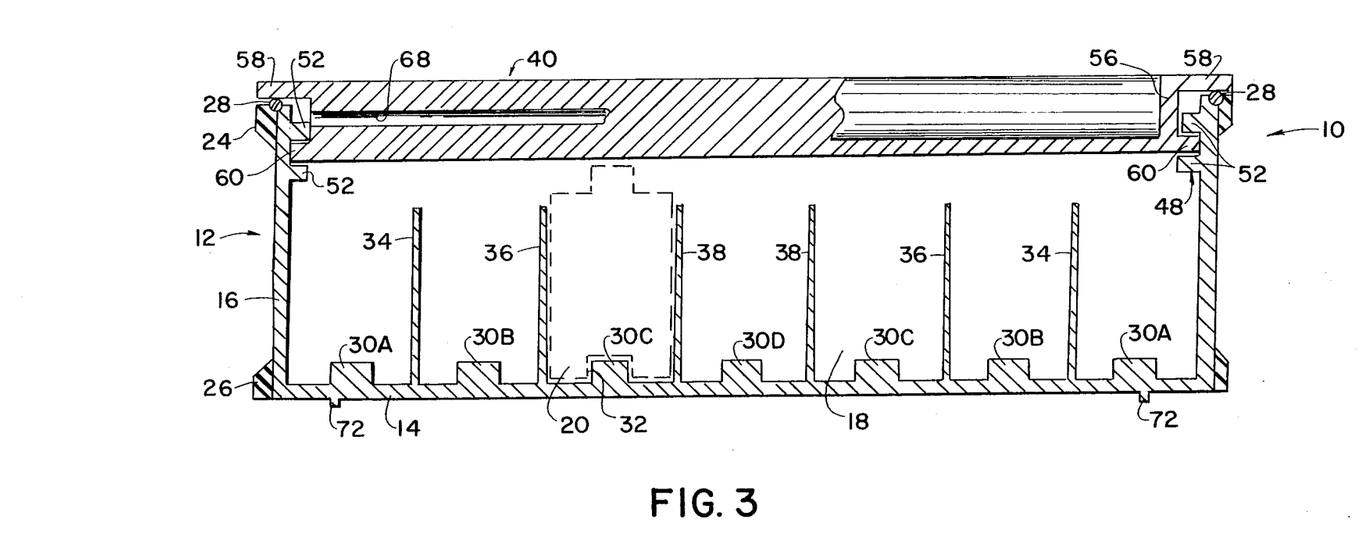
FIG. 3 is a cross-sectional view of the main housing of the film spool storage case of FIG. 1, taken along line 3—3, with the cover secured thereon.
Figure 4:
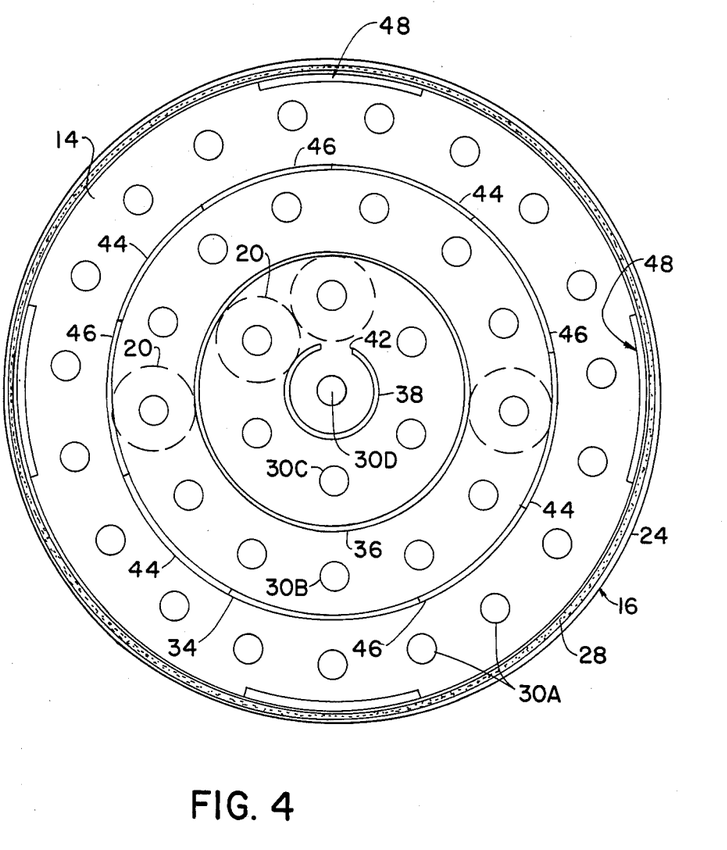
FIG. 4 is a top plan view of the main housing of the film spool storage case of FIG. 1.
Figure 5:
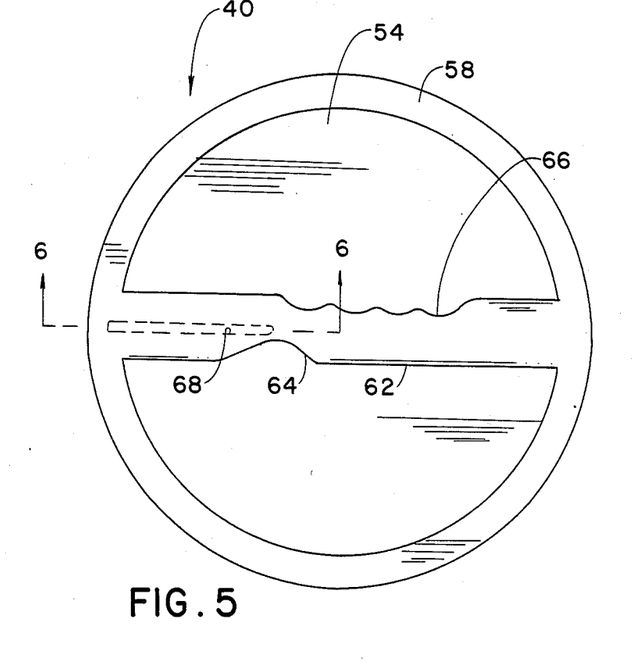
FIG. 5 is a top plan view of the cover of the film spool storage case of FIG. 1.
Figure 6:
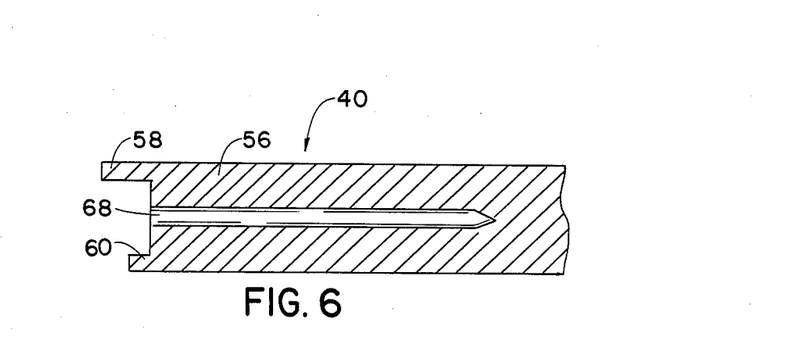
FIG. 6 is a cross-sectional view of the cover of FIG. 5, taken along line 6—6 thereof.

As best shown in FIGS. 3 and 4, a plurality of cylindrical positioning projections 30 are formed with base 14 and extend upwardly therefrom. Positioning projections 30 are uniformly distributed on the surface of base 14 and are designed to receive the cavities 32 at the ends of spools 20. Preferably, as shown in FIG. 4, projections 30 are arranged in spaced relation in a plurality of concentric circles. Thus, 19 projections 30A are formed along the outermost concentric circle, 13 projections 30B are formed in the next inner concentric circle, 6 projections 30C are formed in the next inner concentric circle and a single projection 30D is formed at the center of base 14. Accordingly, there are 39 projections 30 for receiving 39 film spools 20 thereon. This number is of special interest since it corresponds to the average number of film spools 20 used daily by a professional photographer. Of course, however, the present invention is not limited thereby. Such arrangement permits the storage of a maximum number of film spools 20 in main housing 12. With this arrangement, the distance between concentric circles corresponds generally to the diameter of film spools 20 in order that film spools 20 can be positioned side by side.

It is necessary, however, that the film spools 20 be effectively locked in position when main housing 12 is only partly filled with film spools. To this end, concentric partitions 34, 36 and 38 are formed on base 14 in surrounding relation to projections 30B, 30C and 30D, respectively. Thus, each concentric row of film spools 20 is separated and the film spools 20 are effectively locked in position in main housing 12. To maintain a maximum effectiveness in locking of film spools 20 in housing 12, partitions 34, 36 and 38 generally have a height corresponding to the height of film spools 20. Alternatively, partitions 34, 36 and 38 can have a height greater than film spools 20 so as to come into contact with a cover 40 which is removably positionable on main housing 12 in covering relation to opening 22. As shown best in FIG. 1, partition 38 is cut away at a portion 42 thereof to permit the flange of a film spool 20 to extend out from partition 38. In addition, partition 34 has four equidistantly spaced larger height sections 44 and four reduced height sections 46 interspersed between and contiguous with larger height sections 44.

Figure 1:
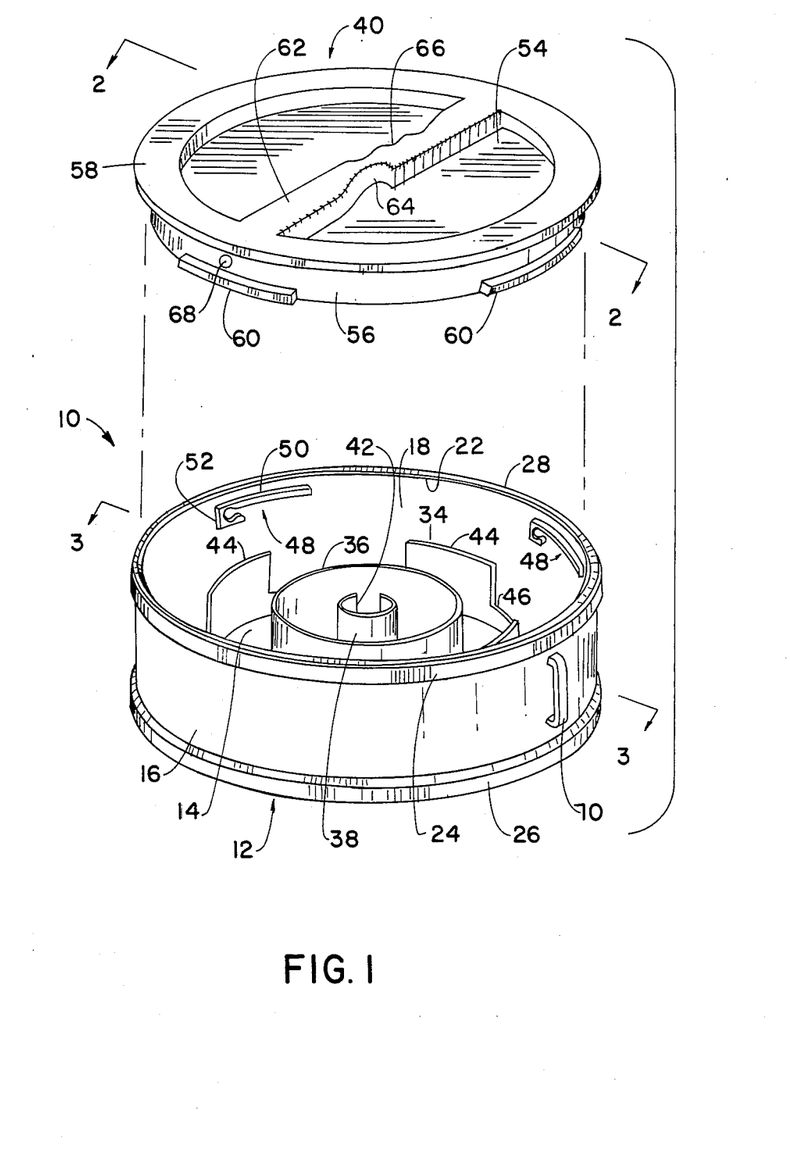
FIG. 1 is a blown-apart perspective view of a film spool storage case according to a first embodiment of the present invention.
Figure 7:
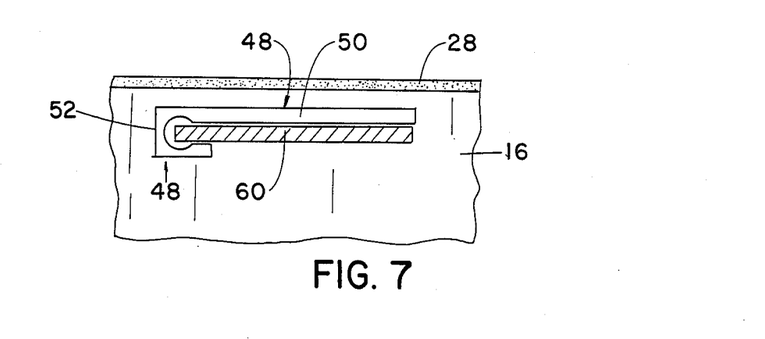
FIG. 7 is a partial cross-sectional view of a portion of the film spool storage case of FIG. 1, showing the manner of locking the cover to the main housing.

As shown best in FIGS. 1 and 7, four cover securing means 48 are secured to the inner surface of side wall 16 near the upper edge thereof and are equidistantly spaced along side wall 16. Each cover securing means 48 is positioned radially in line with a reduced height section 46 of partition 34. This is the reason for providing reduced height sections 46, that is, to permit film spools 20 to be positioned in the outermost concentric circle on projections 30A.

Each cover securing means 48 includes a horizontal ledge 50 secured to the inner surface of side wall 16 in the aforementioned space relation, each horizontal ledge 50 terminating at the same end in a U-shaped bayonet fitting 52 also secured to the inner surface of side wall 16. Bayonet fittings 52 are used for securing cover 40 to housing 12.

Cover 40 includes a circular plate 54. An outer annular wall 56 is connected to the periphery of circular plate 54 and extends upwardly therefrom. An annular cover flange 58 extends radially outward from the upper end of outer annular wall 56. The diameter of circular plate 54 and outer annular wall 56 is less than that of the diameter defined by a circle enscribed by the four cover securing means 48, while the outer diameter of flange 58 is at least as great as that of side wall 16. In this manner, when cover 40 is positioned at opening 22 of side wall 16, circular plate 54 and outer annular wall 56 fit within side wall 16, while annular cover flange 58 rests on the upper edge of side wall 16, and particularly, on sealing ring 28 thereat to provide a moisture seal for storage case 10.

Figure 2:
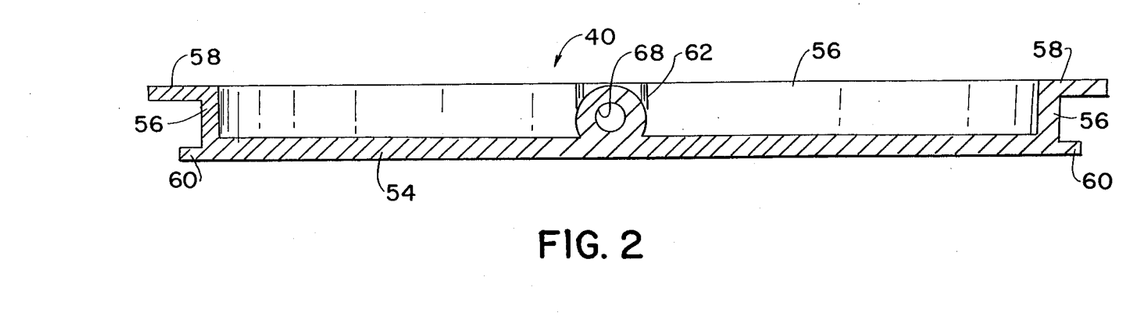
FIG. 2 is a cross-sectional view of the cover of the film spool storage case of FIG. 1, taken along line 2—2 thereof.

Four arcuate blades 60 are equidistantly spaced along the lower edge of circular plate 54, and are preferably flush with the lower surface of circular plate 54, as shown in FIG. 2. An outer imaginary circle which circumscribes blades 60 has a diameter substantially equal to or slightly smaller than the inner diameter of side wall 16 so that circular plate 54, outer annular wall 56 and blades 60 can fit within side wall 16. Thus, when cover 40 is placed on top of main housing 12, blades 60 are first positioned between adjacent cover securing means 48 and then, cover 40 is rotated in the counterclockwise direction of FIG. 1 while being pressed downwardly on sealing ring 28. As a result, blades 60 ride under horizontal ledges 50 of cover securing means 48 and lock within bayonet fittings 52, as best shown in FIG. 7. In this position, cover 40 is releasably locked to main housing 12. In addition, flange 58 provides a moisture-proof seal with sealing ring 28 so as to protect the spools of film within storage case 10.

In order to position and rotate cover 40, cover 40 is provided with a diametrical handle 62 having a thumb gripping recess 64 and finger gripping recesses 66. Thus, the user can easily grasp handle 62 and rotate the same.

In addition, cover 40 is provided with an aperture 68 that extends through annular wall 56 and through handle 62. In this manner, a writing instrument such as a pencil can be inserted through aperture 68 and easily be removed by the photographer to mark the different film spools 20 with different indications for developing or the like.

The storage case 10 of FIG. 1 can easily be carried by the photographer. In this regard, two U-shaped hooks 70 can be secured to the outer surface of side wall 16 in spaced relation, to which a strap (not shown) can be secured for carrying storage case 10.

In addition, a plurality of storage cases 10 can be stackd one upon the other. In this regard, the bottom surface of base 14 is provided with an annular rib 72 having an outer diameter slightly smaller than the inner diameter of annular wall 56 of cover 40. In addition, annular rib 72 is cut away at diametrical positions to receive handle 66. In this manner, annular rib 72 can fit within the outer annular wall 56 of another storage case 10 such that base 14 rests on the annular cover flange 58 thereof.

Thus, with the present invention, a plurality of film spools 20 corresponding to the number of film spools typically used by a photographer during a day's shooting, can be easily organized and stored in storage case 10, which is moisture proof to prevent damage of the film spools stored therein.

Referring now to FIGS. 8-23, a film spool storage case 110 according to a second embodiment of the present invention will now be described, in which elements corresponding to those described above with respect to the embodiment of FIGS. 1-7 are identified by the same reference numerals augmented by 100, and a detailed description thereof will be omitted herein for the sake of brevity.

As shown, film spool storage case 110 includes a rectangular main housing 112 having a rectangular base 114 and a rectangular side wall 116 secured around the periphery of base 114. In this manner, base 114 and side wall 116 define a cavity 118 for receiving a plurality of film spools 120 therein. The upper end of side wall 116 defines an opening 122 and the height of side wall 116 is at least as great as the height of film spools 120, and preferably is greater than the height of film spools 120.

Figure 8:
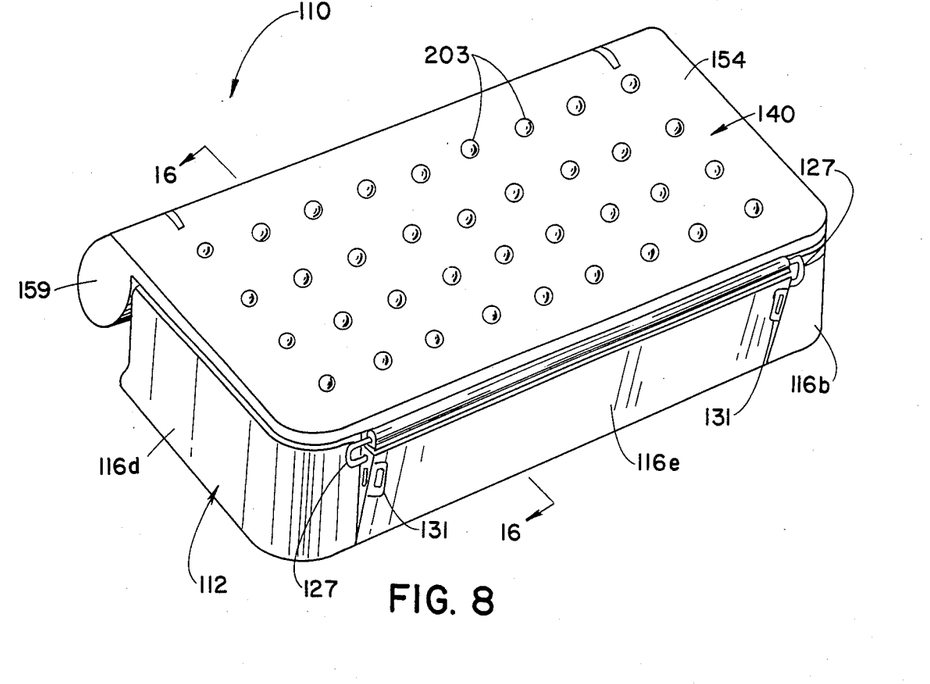
FIG. 8 is a perspective view of a film spool storage case according to a second embodiment of the present invention.
Figure 13:
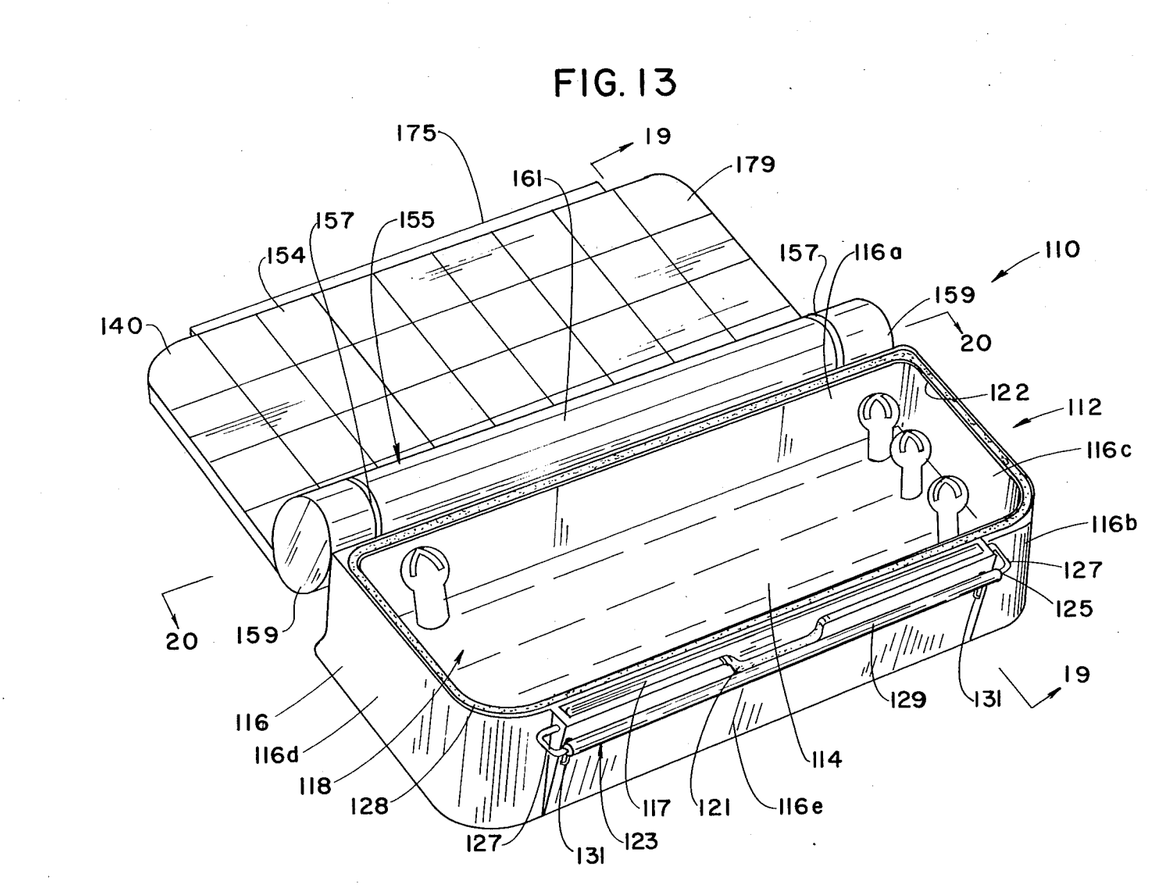
FIG. 13 is a perspective view of the film spool storage case of FIG. 8, shown in an open position.
Figure 16:
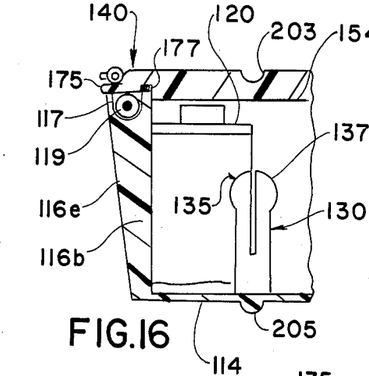
FIG. 16 is a cross-sectional view of a portion of the film spool storage case of FIG. 8, taken along line 16—16 thereof.

As shown best in FIGS. 8 and 13, side wall 116 includes a rear wall 116a, front wall 116b and shorter end walls 116c and 116d. Front wall 116b has a built-up section 116e secured thereto, built-up section 116e having a triangular cross-section with the base of the triangle adjacent opening 122 of side wall 116 and the width of built-up section 116e tapering from opening 122 toward base 114. The upper surface of built-up section 116e has a recess 117 along the length thereof which can receive a writing instrument such as a pencil 119, as shown in FIG. 16. Centrally at the upper end of built-up section 116e, an extending notch 121 is also provided whereby the photographer can insert his finger to remove pencil 119 from recess 117.

A spring clip latch 123 is pivotally secured to opposite sides of built-up section 116e at the upper end thereof. Specifically, spring clip latch 123 includes a substantially rigid wire 125 which extends in front of the upper edge of built-up section 116e and which terminates in two U-shaped wire ends 127 that are pivotally secured in the sides of built-up section 116e, as best shown in FIG. 13. Rigid wire 125 is also preferably covered with a resilient tube 129 of a rubber-like material. With this arrangement, spring clip latch 123 can be pivoted between the open position shown in FIG. 13 and the closed position shown in FIG. 8.

Figure 9:
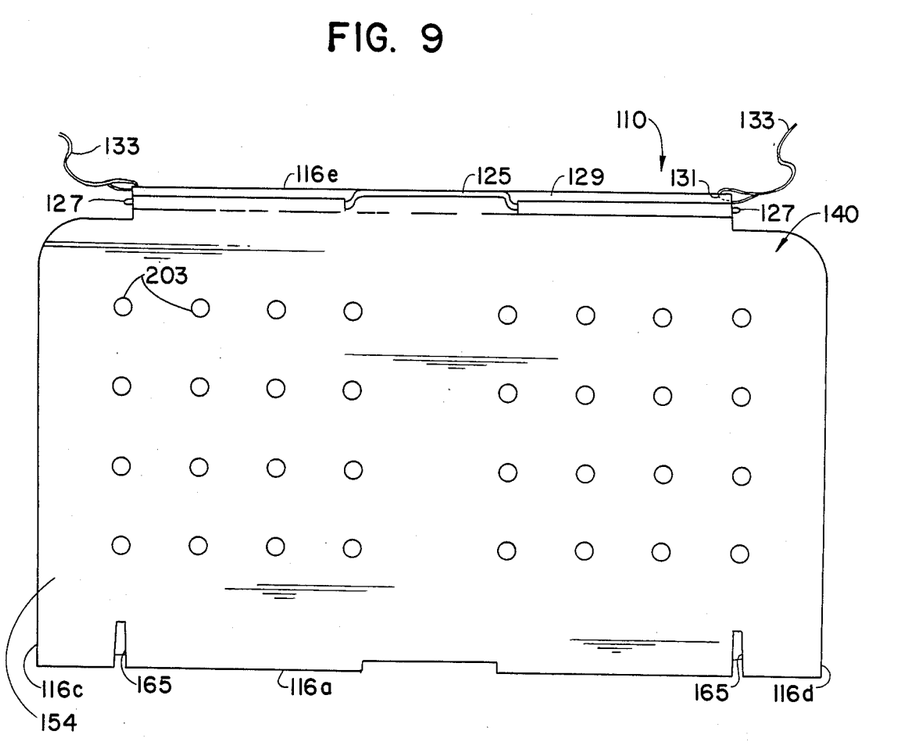
FIG. 9 is a top plan view of the film spool storage case of FIG. 8.
Figure 10:
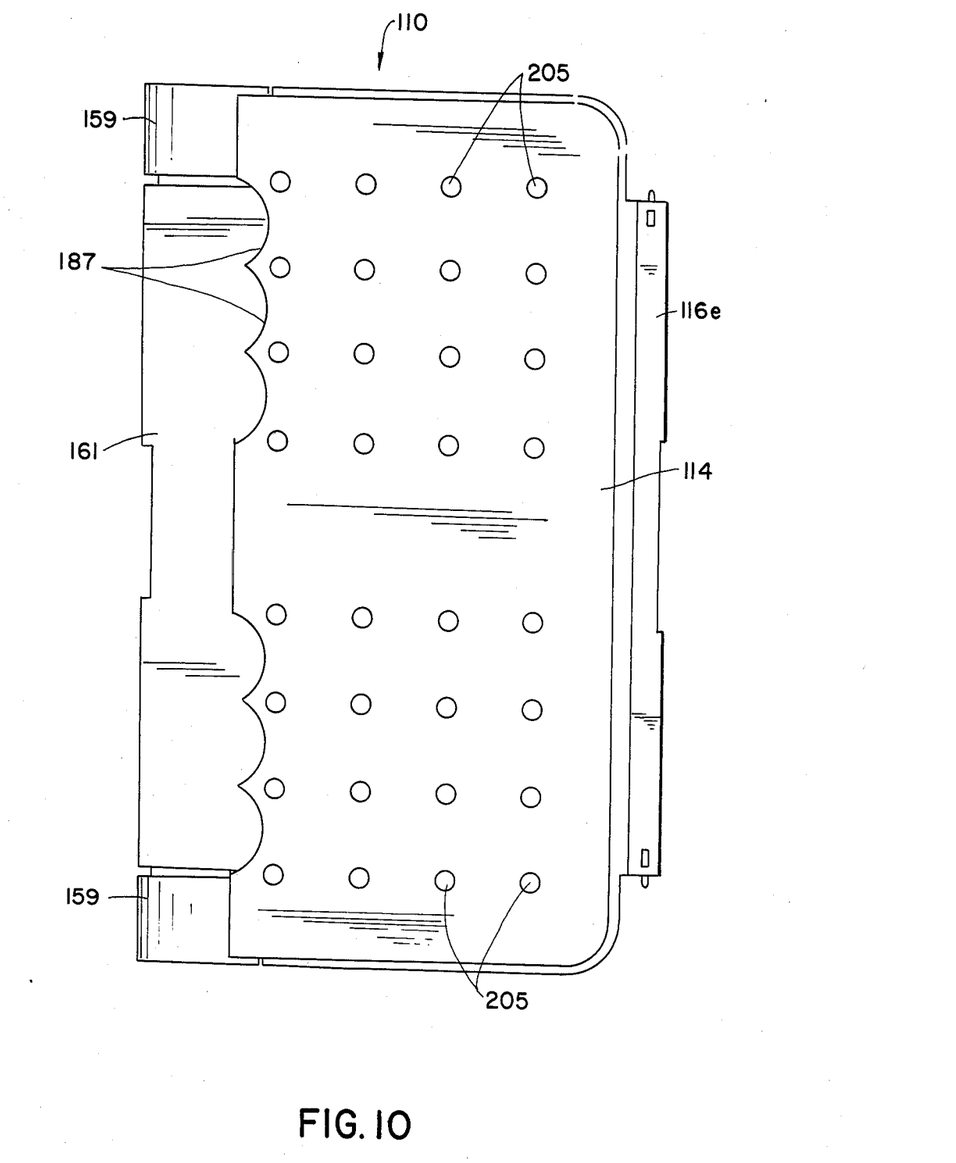
FIG. 10 is a bottom plan view of the film spool storage case of FIG. 8.
Figure 11:
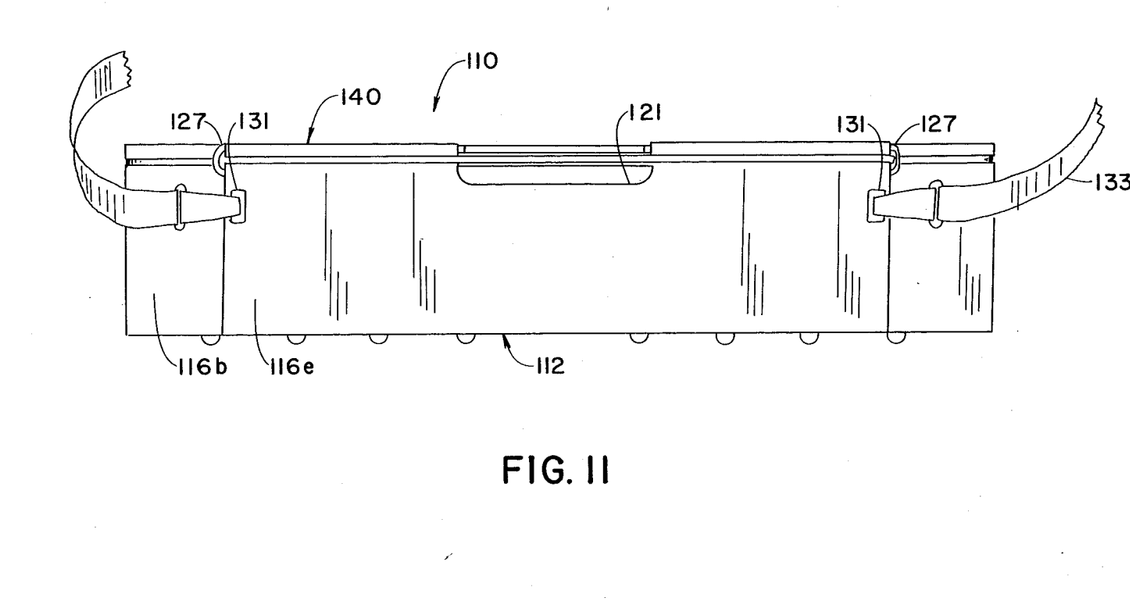
FIG. 11 is a front elevational view of the film spool storage case of FIG. 8.
Figure 12:
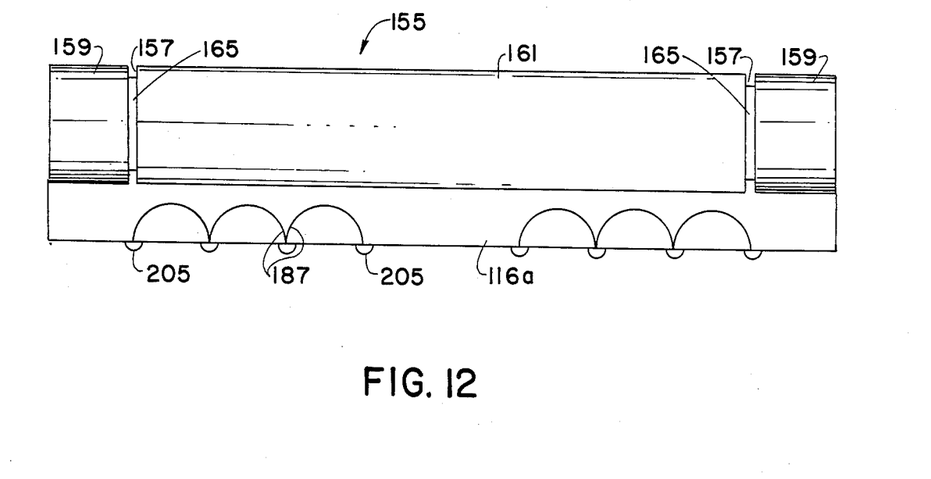
FIG. 12 is a rear elevational view of the film spool storage case of FIG. 8.

In addition, two openings 131 are provided at opposite sides through built-up section 116e, that is, such that they extend from the front of built-up section 116e to each side thereof for receiving a clip therethrough so as to secure a strap 133 to storage case 110, as best shown in FIGS. 8, 9 and 11.

As with film spool storage case 10, storage case 110 includes a gasket or sealing ring 128 at the upper edge of side wall 116 to provide a moisture proof seal when cover 140 is secured thereover, as shown in FIG. 13. Alternatively, as shown in FIG. 16, cover 140 can be formed with a peripheral recess 177, at the periphery of the lower surface of flat cover plate 154 and in which gasket 128 fits to provide a moisture proof seal for storage case 110 in the closed position.

Figure 17:
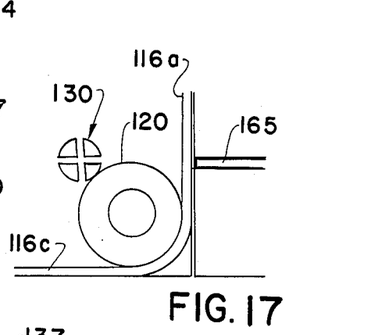
FIG. 17 is a top plan view of a portion of the film spool storage case of FIG. 13.
Figure 18:
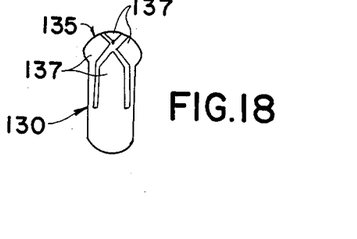
FIG. 18 is a perspective view of one of the projections secured to the base of the main housing.

As best shown in FIGS. 13, 14 and 16-19, a plurality of cylindrical positioning projections 130 are formed with base 114 and extend upwardly therefrom. Positioning projections 130 are uniformly distributed on the surface of base 114 and are designed to receive spools 120 therebetween in a tight fitting manner. Each positioning projection 30 therefore includes an enlarged head 135 and is cut along the length thereof to define four vertically oriented spring fingers 137. Thus, spring fingers 137 which are normally separated by a small distance from each other, can be compressed toward each other, as shown in FIG. 17, when a film spool 120 is placed between adjacent projections 130 to provide a secure holding of film spools 120 in housing 112.

Figure 14:
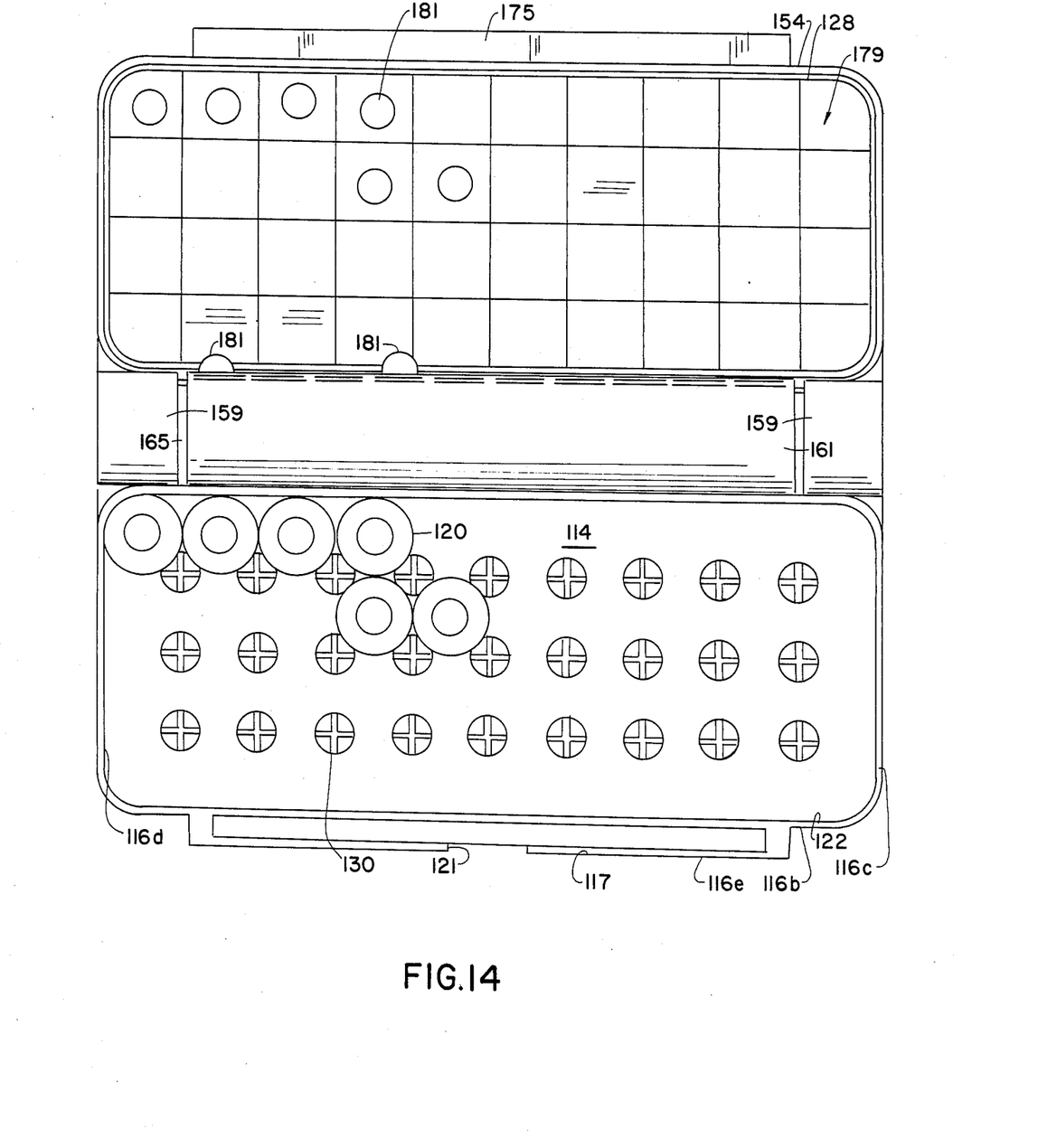
FIG. 14 is a top plan view of the film spool storage case of FIG. 13.

Preferably, as shown in FIG. 14, projections 130 are arranged in three rows of nine projections each. With this arrangement, forty film spools 120 can be held by positioning projections 130.

Figures 20, 21:
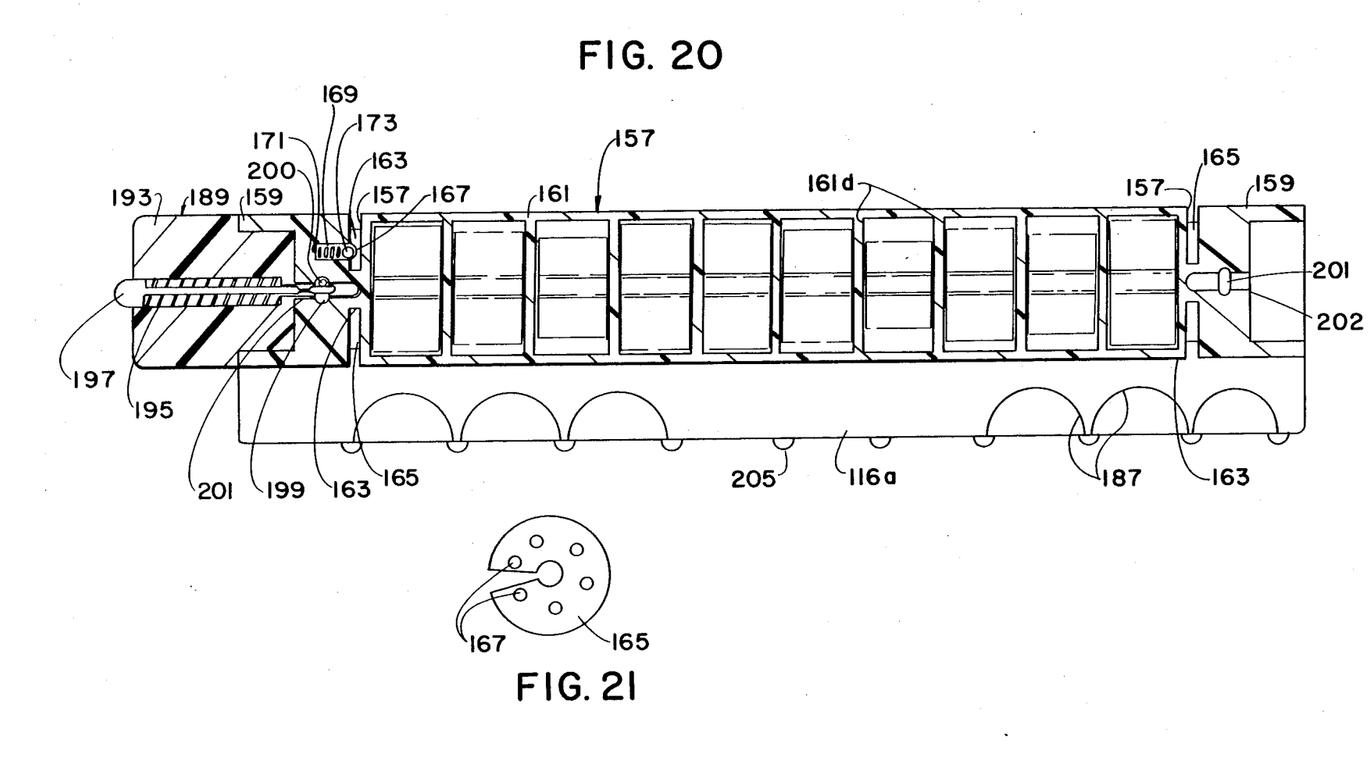
FIG. 20 is a cross-sectional view of the film spool storage case of FIG. 13, taken along line 20—20 thereof.
FIG. 21 is a plan view of a wing of the film spool storage case of FIG. 8, showing a plurality of detent recesses therein.

Cover 140, unlike cover 40, is hingedly secured to main housing 112. Specifically, cover 140 includes a flat cover plate 154 having a rectangular configuration with dimensions similar to that of main housing 112. One longer edge of cover plate 154 is secured to a cylindrical hinging section 155 having slots 157 formed therein spaced slightly inwardly from the opposite ends thereof. Slots 157, as best shown in FIG. 20, have an annular configuration, and separate cylindrical section 155 into outer hub sections 159 and an inner hub section 161. Thus, outer hub sections 159 are connected to inner hub section 161 by means of reduced diameter sections 163, as best shown in FIG. 20. A pair of spaced, planar wings 165 are secured to rear wall 116a of housing 112 and fit within slot 157 about reduced diameter sections 163 so as to hingedly secure cylindrical hinging section 155 and thereby cover 140, to rear wall 116a of housing 112.

Preferably, the outer face of one wing 165, as shown in FIG. 21, is formed with a plurality of circumferentially spaced recesses 167. One outer hub section 159 is formed with an inner bore 169 that opens toward the recesses 167 on wing 165. A coil spring 171 is received in bore 169 and normally biases a ball 173 out from bore 169. Thus, when cylindrical section 155 is assembled with wings 165, ball 173 is biased by spring 171 into a desired recess 167 in the respective wing 165 to releasably lock cover 140 in a desired angular position. As cover 140 is pivoted to a different angular position, a flat section of the respective wing 165 biases ball 173 against the force of coil spring 171 and into bore 169. As a new recess 167 arrives at the location of bore 169, ball 173 is again biased into the new recess 167 to releasably lock cover 140 at a different angular position.

The opposite longer edge of flat cover plate 154 is formed with a thin flange 175 extending substantially along the entire length thereof and which extends in covering relation to recess 117 of housing 112 in the closed position, as shown in FIG. 16. In this position, spring clip latch 123 is rotated upwardly so as to engage over the upper surface of flange 175 and thereby lock cover 140 over housing 112. It will also be appreciated that pencil 119 is securely held within recess 117 when cover 140 is locked in the closed position.

In order to provide instructions for developing the different film spools 120 held within storage case 110, the inner surface of cover plate 154 of cover 140 is preferably provided with grid structure markings 179 which divides the area into forty squares. In accordance with the preferred embodiment, the 40 squares correspond in location to the 40 film spools 120 held within storage case 110. In this manner, a colored paper dot or the like can be placed in each square corresponding to the particular instructions to be given for each film spool 120. For example, an orange dot may indicate one set of instructions, a red dot another set of instructions and so on.

Figures 15, 19:
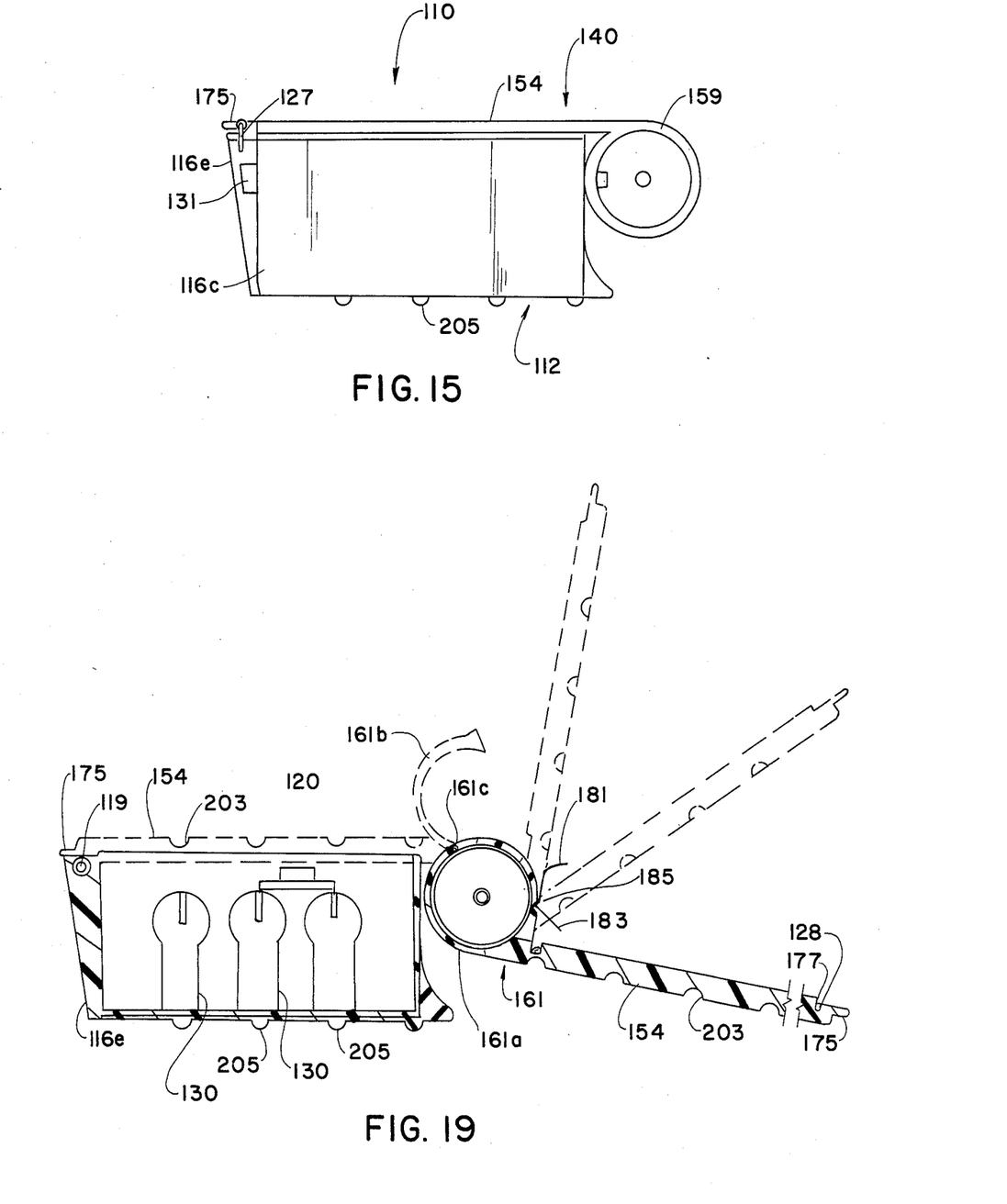
FIG. 15 is a side elevational view of the film spool storage case of FIG. 8.
FIG. 19 is a cross-sectional view of the film spool storage case of FIG. 13, taken along line 19—19 thereof.

In order to provide the different colored dots, inner hub section 161, as shown in FIG. 19, is preferably made hollow and is formed with a base section 161a and a cover section 161b pivotally secured to base section 161a by a pivot pin 161c. The inside of base section 161a, as shown in FIG. 20, is compartmentalized by dividing sections 161d, which are spaced apart so that the different compartments can receive a different roll of colored dots. The colored dots 181 are conventional and have an adhesive coating and are held on a rolled backing sheet 183 having a release coating thereon. A wedge-like mechanism 185, which is conventional, is provided at the free end of cover section 161b. thus, the user merely pulls a colored dot 181 out, as shown in FIG. 19, which results in backing sheet 183 being pulled from another opening. This arrangement is conventional. thus, the pulled out colored dot 181 can be then adhered on any desired square defined by grid structure markings 179.

Storage case 110 can be carried by any suitable means. For example, it was previously described how strap 133 can be used to carry storage case 110. Alternatively, the lower portion of rear wall 116a can be provided with finger depressions 187 on both sides thereof by which storage case 110 can be grasped by the user.

Figure 22:
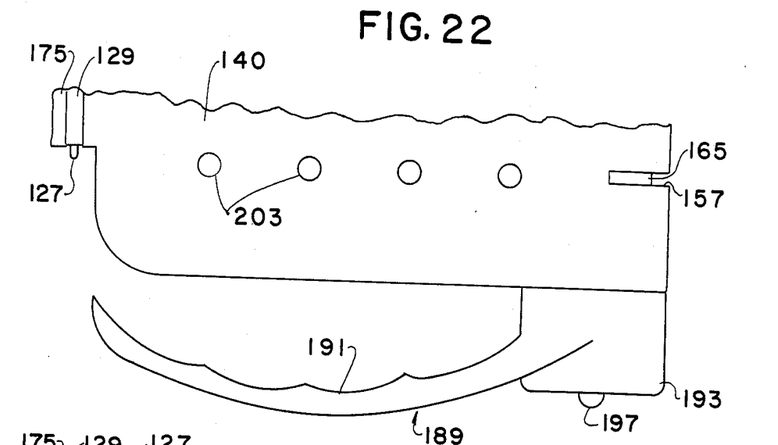
FIG. 22 is a top plan view of a portion of the film spool storage case of FIG. 8, shown with a handle attached thereto.
Figure 23:
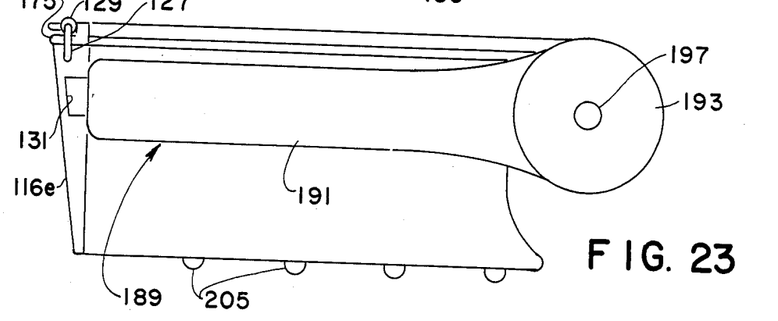
FIG. 23 is a side elevational view of the film spool storage case of FIG. 22.

Alternatively, a handle 189 can be provided which releasably connects with housing 112. In one embodiment of handle 189, as shown in FIGS. 20, 22 and 23, handle 189 includes a holding section 191 which is generally thin and curved and which is grasped by the user. Holding section 191 terminates at one end in a connecting section 193 that releasably connects with one outer hub section 159, as shown in FIG. 20. Specifically, a quick release spring mechanism 195 is provided with a push button 197 and a plunger/ball bearing release 199 that releasably engages within a bore 201 in either outer hub section 159. When spring mecahnism 195 is depressed, steel balls 200 of plunger/ball bearing release 199 disengage from recess 202 in bore 201 of hub section 159 and permit handle 189 to be removed.

As with storage case 10, storage case 110 also has the ability to be stacked with other storage cases 110. In this regard, the upper surface of cover plate 154 of cover 140 is provided with a plurality of spaced recesses 203 and the underside of base 114 is provided with a plurality of spaced projections 205 which are arranged to correspond to recesses 203 and fit therein when a plurality of storage cases 110 are stacked one upon the other.

Figure 24:
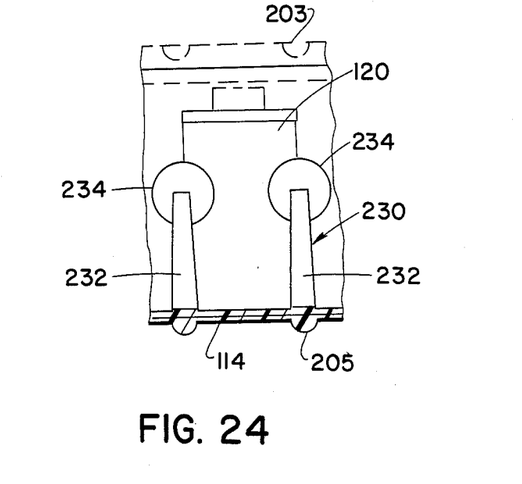
FIG. 24 is a cross-sectional view of a portin of a modified film spool storage case.

An alternative modification of the projections 130 is shown in FIG. 24 by projections 230, which include an enlarged, substantially spherical and resilient head 234 secured to the upper end of each post 232. Thus, film spools 120 are frictionally held in position between adjacent heads 234.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. A film spool storage case comprising:
   a main housing having a base and a side wall, said base and said side wall defining a cavity for receiving a plurality of film spools therein, said side wall having a height at least as great as the height of said spools and said side wall defining an opening at an upper end thereof;
   a cover hingedly secured to said housing in covering relation to said opening;
   a plurality of projecting positioning means secured to said base for positioning said film spools in said cavity in spaced relation in a predetermined pattern; and
   said cover having a surface with a grid representation thereon corresponding to said predetermined pattern for receiving information with respect to each said spool.

2. A film spool storage case according to claim 1, including seal means for providing a moisture proof seal of said case when said cover is releasably secured to said housing.

3. A film spool storage case according to claim 1, wherein said main housing has a substantially rectangular configuration.

4. A film spool storage case according to claim 1, wherein said projecting positioning means are formed in substantially linear rows in said main housing for engaging a plurality of film spools therebetween.

5. A film spool storage case according to claim 1, wherein said cover is hingedly secured to said main housing and has a flange at a front edge thereof; and further including locking means for engaging said flange to releasably lock said cover in a closed position on said main housing.

6. A film spool storage case according to claim 5, wherein said locking means includes a spring clip latch pivotally secured to said main housing and engageable over said flange to releasably lock said cover in said closed position.

7. A film spool storage case according to claim 1, wherein said cover includes cylindrical hub means at one edge thereof for hingedly securing said cover to said main housing.

8. A film spool storage case according to claim 1, wherein said main housing includes a built-up section having a recess therein for holding a marking instrument.

9. A film spool storage case according to claim 1, wherein said main housing includes finger indentations for grasping by a user.

10. A film spool storage case according to claim 1, further including a handle having quick release means for releasably securing said handle to said case.

11. A film spool storage case according to claim 1, wherein said cover has first positioning means on an upper surface thereof, and said base has second positioning means on a lower surface thereof for engaging with said first positioning means of another storage case, wherein a plurality of said storage cases can be stacked one on top of the other.

12. A film spool storage case comprising:
a main housing having a base and a side wall, said base and said side wall defining a cavity for receiving a plurality of film spools therein, said side wall having a height at least as great as the height of said spools and said side wall defining an opening at an upper end thereof;
a cover hingedly secured to said housing in covering relation to said opening; and
a plurality of projecting positioning means secured to said base for positioning said film spools in said cavity in spaced relation, each projecting positioning means including a post having a plurality of spring fingers for engaging against a side of said film spools.

13. A film spool storage case comprising:
a main housing having a base and a side wall, said base and said side wall defining a cavity for receiving a plurality of film spools therein, said side wall having a height at least as great as the height of said spools and said side wall defining an opening at an upper end thereof;
a cover hingedly secured to said housing in covering relation to said opening and movable between an open position and a closed position;
a plurality of projecting positioning means secured to said base for positioning said film spools in said cavity in spaced relation; and
means for holding said cover in a plurality of discrete pivoted positions with respect to said main housing, between said open and closed position.

14. A film spool storage case according to claim 13 wherein said main housing includes wing means for hingedly securing said cover thereto; and said means for holding includes detent means engageable with said wing means.

15. A film spool storage case comprising:
a main housing having a base and a side wall, said base and said side wall defining a cavity for receiving a plurality of film spools therein, said side walls having a height at least as great as the height of said spools and said side wall defining an opening at an upper end thereof;
a cover hingedly secured to said housing in covering relation to said opening, said cover including a bore;
a plurality of projecting positioning means secured to said base for positioning said film spools in said cavity in spaced relation ;
said main housing further including wing means hingedly securing said cover thereto, said wing means including a plurality of recesses therein; and
means for holding said cover in a plurality of pivoted positions with respect to said main housing, said means for holding including detent means and said detent means includes a spring positioned in said bore and having a free end and a ball normally biased by said spring into a desired one of said recesses in said wing means.

16. A film spool storage case comprising:
a main housing having a base and a side wall, said base and said side wall defining a cavity for receiving a plurality of film spools therein, said side wall having a height at least as great as the height of said spools and said side wall defining an opening at an upper end thereof;
a cover hingedly secured to said housing in covering relation to said opening, said cover including cylindrical hub means at one edge thereof for hingedly securing said cover to said main housing, said hub means including a substantially semi-cylindrical base section and a substantially semi-cylindrical cover section hingedly secured to said base section and defining a cavity therein for holding a plurality of rolls of marking indicia.

17. A film spool storage case comprising:
a main housing having base and a side wall, said base and said side wall defining a cavity for receiving a plurality of film spools therein, said side wall having a height at least as great as the height of said spools and said side wall defining an opening at an upper end thereof;
a cover hingedly secured to said housing in covering relation to said opening; and
a plurality of projecting positioning means secured to said base for positioning said film spools in said cavity in spaced relation, each positioning projecting means including having a free upper end, and an enlarged resilient head on the free upper end of the post for engaging a plurality of film spools between said heads.

* * * * *